March 3, 1964  G. B. MARSDEN  3,123,371
CHUCK ARRANGEMENT
Filed Aug. 28, 1961  6 Sheets-Sheet 3

Fig. 8

INVENTOR:
George B. Marsden,
BY
Bair, Freeman & Molinare
ATTORNEYS.

United States Patent Office 3,123,371
Patented Mar. 3, 1964

3,123,371
CHUCK ARRANGEMENT
George B. Marsden, 208 S. Brand Blvd.,
San Fernando, Calif.
Filed Aug. 28, 1961, Ser. No. 134,468
12 Claims. (Cl. 279—110)

This invention relates in general to chucks and more particularly to an improved chuck which is readily set to accept and support work pieces differing over a wide range of diameters and which may be operated to quickly release and engage work pieces without setting the chuck jaws.

One problem in chucking items such as pipe and the like is to secure as wide a range of movement for the chuck jaws as possible. This enables the chuck jaws to accommodate pipes or tubes of considerable variance in diameters and thereby eliminates the need for a series of collets to accommodate work pieces in different size ranges.

In rotary type chucks wherein the work piece and chuck are rotated, proper support for the pipe along its axis must be provided so that all portions thereof are maintained concentric, but at the same time this requirement must be compatible with the requirement that the chuck be capable of receiving pipe of differing diameter. Previously this had been accomplished by the use of pads or feed tubes which were used to center the work piece and were separately set up for each change in work piece diameter range.

In addition thereto, economy in labor requires that the chuck be capable of quick and accurate adjustment, while at the same time be capable of quickly engaging or disengaging the work pieces.

It is, therefore, an object of the present invention to provide a chuck arrangement which is capable of overcoming the aforementioned and other problems and providing quick release and engagement action for firmly grasping a work piece.

In accomplishing the foregoing object, a chuck arrangement utilizing the concepts of the present invention incorporates the technique of permitting the chuck jaws to be moved solely along radial lines extending from the axis of the work piece by means of two separate mechanisms. One mechanism is used to set the chuck jaws to the diameter of the work piece. The second mechanism enables the chuck jaws to be freely retracted along the radial lines from their setting, without changing the relative position of the first mechanism, to enable the work piece to be extracted from the chuck and another inserted so that the jaws can be returned to their original setting without adjustment for engaging the other work piece. It will be understood that the other or second work piece may be simply another length of a pipe or tube from which the first work piece is formed. Since the jaws move solely in a radial direction, they do not disturb the position of the work piece along its longitudinal axis. In addition, there is provided a group of trunnion bar assemblies mounted parallel to the longitudinal axis of the chuck and rotatable in an arc intersecting any of the work piece peripheries whereby the trunnion bar assemblies may be set in tangential or touching relationship with work pieces of considerable variance in diameter for supporting such work pieces.

These and other objects, advantages and functions of the invention will be apparent upon reference to the following specification and claims, together with the drawings.

Figure 1:
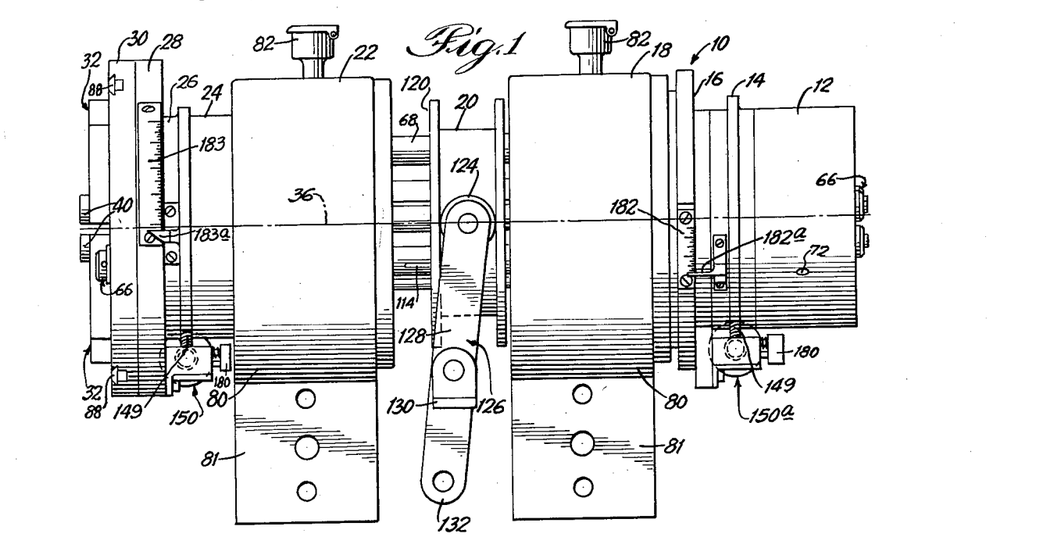
FIGURE 1 is a side elevational view of a rotary chuck assembly incorporating the principles of the present invention.
Figure 2:
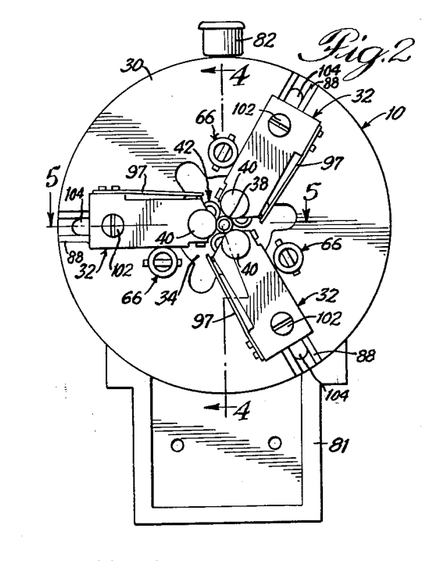
FIGURE 2 is a front elevational view of the chuck assembly shown in FIGURE 1.

In FIGURE 1 a rotatable chuck assembly is indicated by the reference character 10. Looking from right to left in FIGURE 1 it will be seen that this chuck assembly comprises a drive pulley 12, a worm gear 14, a thrust ring 16, a first bearing assembly 18, a shift collar 20, a second bearing assembly 22, a back plate 24, a worm gear 26, a scroll plate 28, a face plate 30, and three chuck jaw assemblies 32 as seen in FIGURE 2. All of these components with the exception of the jaw assemblies are provided with a central passageway or aperture 34 and are mounted coaxially about a central axis 36 along which a work piece 38, seen in FIGURES 2 and 3, is centered as will be explained. The chuck jaw assemblies 32 each have a roller or jaw 40 and are mounted on the face plate 30 at the conventional angle of 120° to each other. They are adapted to be moved radially either toward or away from the central axis 36 for the purpose of enabling the respective rollers or jaws 40 to grasp or release the work piece 38 and to accept work pieces of different diameter.

Figure 3:
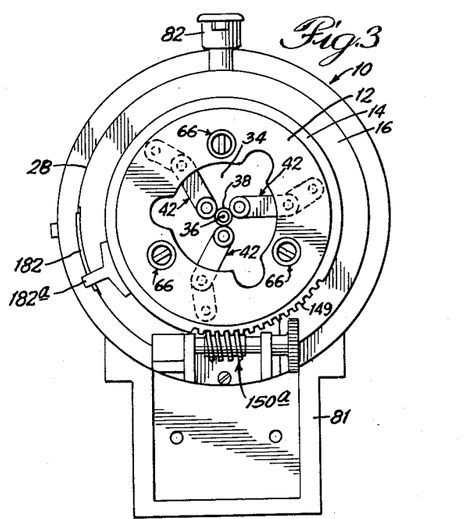
FIGURE 3 is a rear elevational view of the chuck assembly shown in FIGURE 1.
Figure 4:
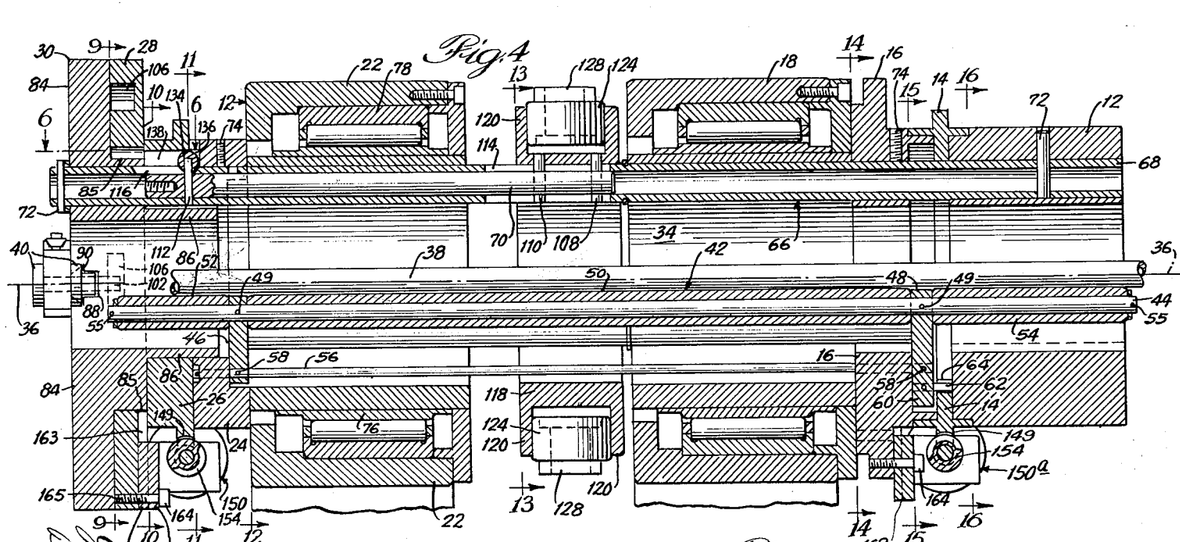
FIGURE 4 is a section taken along the line 4–4 in FIGURE 2.
Figure 8:
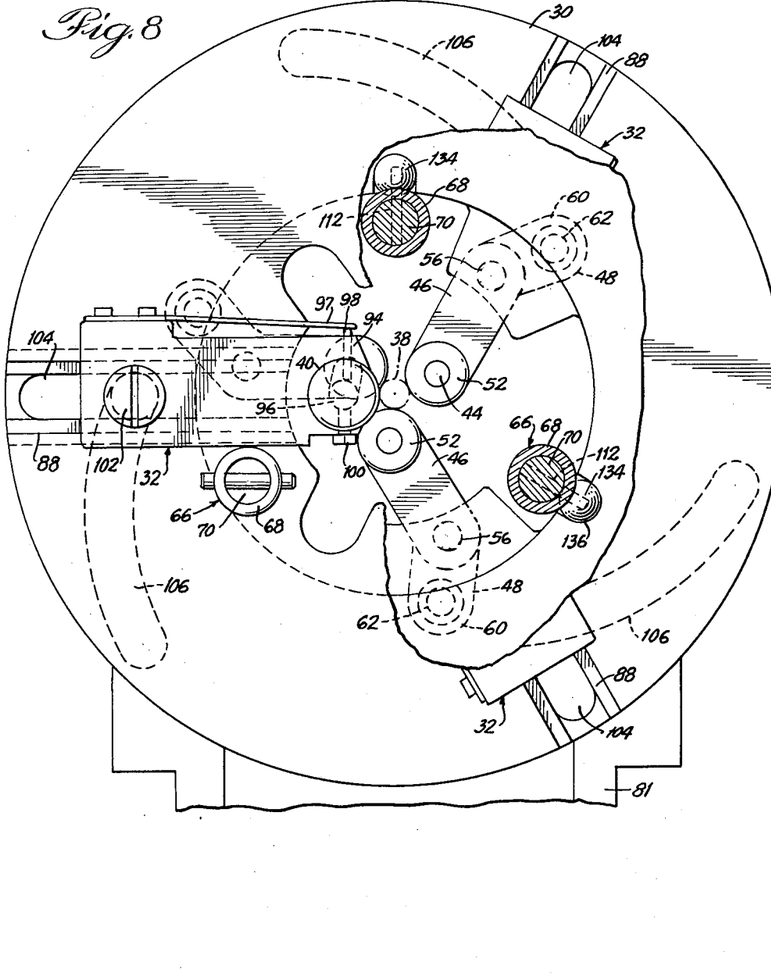
FIGURE 8 is a front view of the chuck assembly with a portion of the face plate removed to illustrate the angular relationship of the chuck components.

The work piece 38 usually comprises a rod, tube or pipe, and in addition to being grasped by the jaws 40 is supported along its length in the passageway 34 by three trunnion bar assemblies 42, as seen in FIGURES 3 and 8 for example, and one of which is seen in detail in FIGURE 4.

Each trunnion bar assembly 42 comprises a tie bar or rod 44 passing through suitable apertures located at one end of a pair of spaced apart link arms 46 and 48. The link arm 46 is located between the back plate 24 and the bearing assembly 22, while link arm 48 is located between ring 16 and gear 14. Pins 49 secure the respective rod 44 to the respective link arm 46 and 48. A sleeve 50 is rotatably mounted on rod 44 intermediate the two link arms, while sleeves 52 and 54 are rotatably mounted on the respective ends of rod 44 protruding from the link arms 46 and 48 and held thereon by suitable pins 55.

Each link arm 46 is also apertured at its other end to receive a trunnion rod 56 which extends through an aligned aperture in the link arm 48. The rods 56 are pinned at 58 to the respective link arms 46 and 48 and are rotatably supported in respective apertures in the back plate 24 and the thrust ring 16. A pin at the end of the rods 56 extending through the back plate 24 prevents the assembly from being moved along the axis 36.

Figures 13, 14, 15, 16, 17, 18:
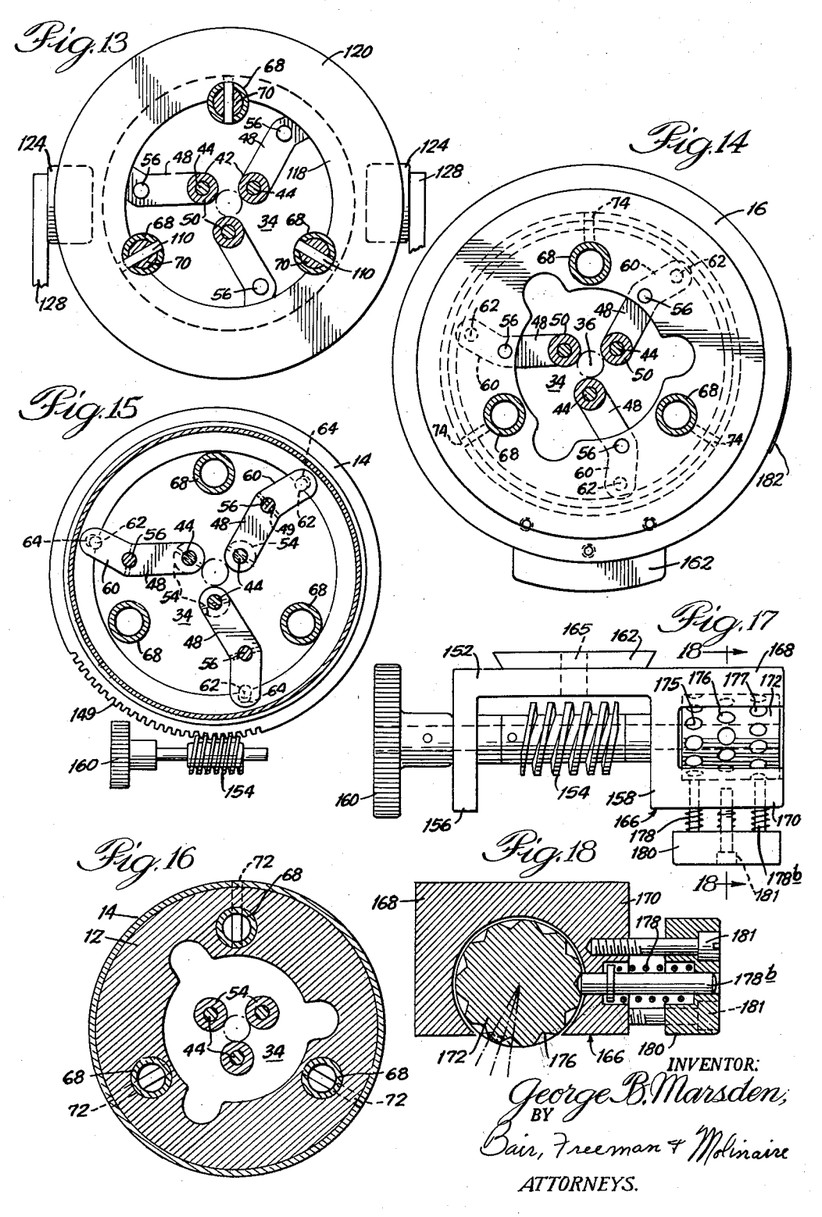
FIGURE 13 is a sectional view taken through the line 13–13 in FIGURE 4.
FIGURE 14 is a sectional view taken through the line 14–14 in FIGURE 4.
FIGURE 15 is a sectional view taken through the line 15–15 in FIGURE 4.
FIGURE 16 is a sectional view taken through the line 16–16 in FIGURE 4.
FIGURE 17 is a side elevational view of the worm and detent mechanism for adjusting the chuck.
FIGURE 18 is a sectional view taken through the line 18–18 in FIGURE 17.

The link arm 48 has an offset portion or arm 60, also seen in FIGURE 15, for example, and this offset arm receives a short rod 62 therethrough as seen in FIGURE 4. The rod 62 is pinned to the offset arm 60 and extends into a recess or slot 64 of similar dimension in the periphery of the passageway through the worm gear 14. Thus, whenever the worm gear 14 is rotated, one side of recess 64 engages against each rod 62 to swing the offset arm 60 and link arm 48 together with the rod 56. The respective rod 44 and the sleeves 50, 52 and 54 of each trunnion assembly therefore rotate about the axis of rod 56 and either toward or away from the axis 36 to accommodate the work piece 38 between the sleeves of the trunnion bar assemblies.

The drive pulley 12 is adapted to be engaged by a drive belt in a conventional manner for rotating the chuck jaws and work piece 38, it being understood that other means for rotating the same may be provided. Three chuck actuator assemblies 66 serve to transmit the driving force from the pulley 12 to the other components.

The actuator assemblies 66 each comprise a sleeve 68 and a rod 70 slidably received therein. The sleeves 68 are engaged with respective apertures or recesses in the drive pulley 12, the thrust ring 16, the bearing assemblies 18 and 22, the shift collar 20, the back plate 24, and extend through the face plate 30 as seen in FIGURES 4, 9, 11, 12, 13, 14 and 16. Thus, when the drive pulley 12 is rotated, it in turn rotates the chuck actuator assemblies 66 to in turn rotate the thrust ring 16, the shift collar 20, the back plate 24 and the face plate 30. Since the trunnion assemblies 42 are engaged with the back plate 24 and the thrust ring 16, the trunnion assemblies 42 will also rotate to rotate the worm gear 14 therewith. Each sleeve 68 is secured in front of the face plate 30 and in its respective aperture in the drive pulley 12 by a respective pin 72, while in its respective aperture through the thrust ring 16 and back plate 24, a respective set screw 74 engages the sleeve 68.

It will be noted that the actuator assemblies 66 are also engaged with the bearing assemblies 18 and 22. The bearing assemblies 18 and 22, as may be gathered from FIGURE 12, each comprises an inner race 76 having spaced apart recesses in which the respective sleeves 68 are received so that the races 76 rotate therewith. Each inner race 76 is appropriately engaged with an outer race 78 which is in turn carried in a respective housing 80. The housings 80 each have a mounting bracket 81 thereon, seen in FIGURES 1, 2 and 3, which enables the entire chuck assembly 10 to be suitably supported on a chuck bed, for example, and each is provided with suitable lubricant receiving apparatus 82.

Figure 5:
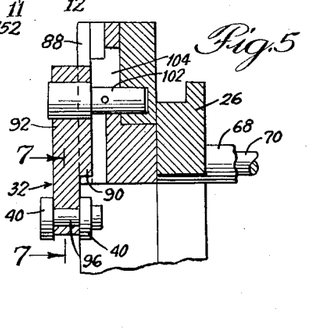
FIGURE 5 is a sectional view taken along the line 5–5 in FIGURE 2 to illustrate the chuck jaw assembly.
Figure 6:
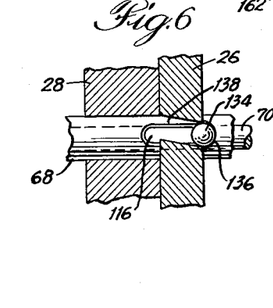
FIGURE 6 is a detailed view illustrating the manner in which the actuator rod detent ball is related to the back plate and worm gear.

The face plate 30 comprises a circular portion 84 having a rearwardly extending shoulder 85, and the sleeve 68 extends therethrough so that the face plate 30 rotates therewith about axis 36, as before mentioned. The shoulder 85 is engaged by the scroll plate 28 and terminates in a hub portion 86, which engages the worm gear 26 and the back plate 24. The portion 84 is provided with a number of spaced apart ways or dovetail guide recesses 88. The guide recesses 88 extend along respective radial lines from the central axis 36 at 120° intervals and are displaced from the chuck actuator sleeves 68. Each guide recess 88 receives a correspondingly shaped dovetail 90 on the jaw assemblies 32 as seen in FIGURES 4 and 5.

Figure 7:
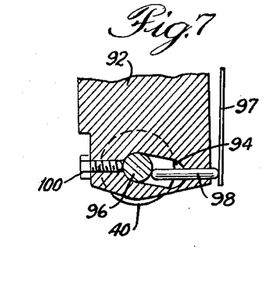
FIGURE 7 is a detailed view illustrating the engagement of the chuck jaws in the jaw assembly.

The jaw assemblies 32 each comprise block 92 on which the dovetail 90 is formed. Each has a slot 94 adjacent the end closest to the work piece 38 in which a shaft 96 is received carrying a pair of rollers or chuck jaws 40. The longitudinal axis of slot 94 is transverse to a radial line from the central axis 36 and is inclined thereto at about 5° as seen in FIGURE 7 in the direction of work piece rotation. The rollers 40 are normally biased in one direction by a spring 97 mounted on the block 92 and engaging a pin 98, which extends into the slot 94 so that it bears against the axle 96. The shaft 96 is thus biased against an adjustment screw 100 which is adjusted to limit the movement of the rollers 40 in one direction along the slot axis. Thus as the jaw plate 30 rotates, it in turn rotates the jaw assemblies 32. Since the rollers are engaged with the work piece 38, as will be explained, the work piece 38 will rotate therewith. As the work piece 38 rotates, the rollers 32 will shift slightly so as to tightly grip and wedge the work piece.

The other end of the block 92 is provided with a pin or roller 102, extending through the dovetail 88 and through a longitudinal aperture 104 in plate 30 and located along the axis of each guide recess 88. The pin 102 thus extends through the aperture 104 in the portion 82 and engages an elongate scroll or cam recess 106 in the scroll plate 28.

Figures 9, 10:
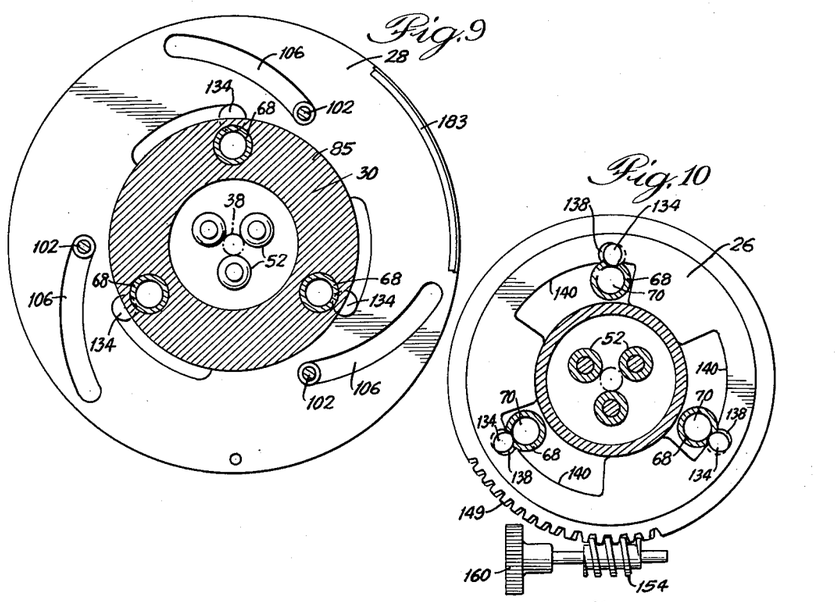
FIGURE 9 is a sectional view taken through the line 9–9 in FIGURE 4.
FIGURE 10 is a sectional view taken through the line 10–10 in FIGURE 4.
Figures 11, 12:
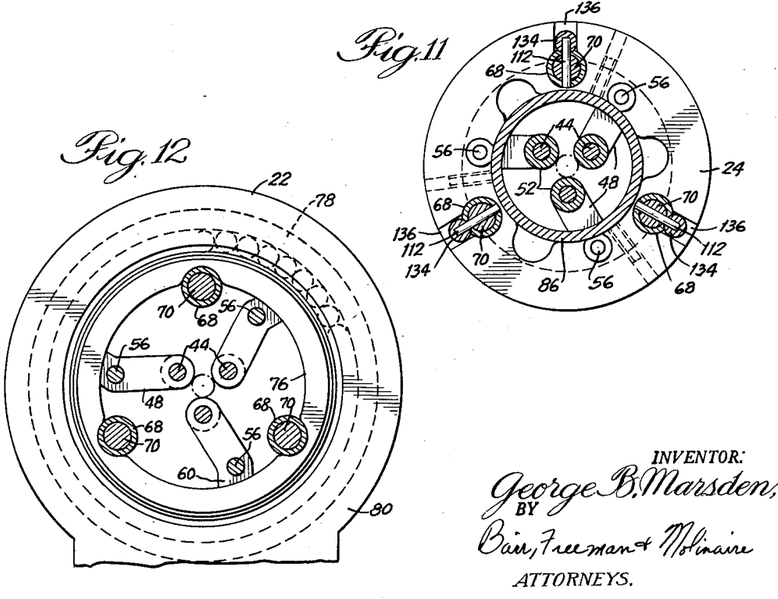
FIGURE 11 is a sectional view taken through the line 11–11 in FIGURE 4.
FIGURE 12 is a sectional view taken through the line 12–12 in FIGURE 4.

The scroll plate 28 is provided with a cam recess 106 for each roller 102. Each recess 106 is substantially the same width as the diameter of the rollers. Each recess extends over about 45'° of arc whose radius terminates in an axis offset from the central axis 36 so that each recess has one end adjacent the shoulder 85 and terminates adjacent the outer periphery of the scroll plate 28. Thus, if the scroll plate is rotated clockwise as seen in FIGURES 8 and 9 with respect to face plate 30, it will cam the rollers 102 and jaw assemblies 32 in a solely radial direction away from the work piece 38 and the central axis 36. On the other hand, if the scroll plate is rotated counterclockwise with respect to the face plate, the rollers 102 together with the jaw assemblies 32 are moved solely radially toward the work piece 38.

Returning now to the chuck actuator assemblies 66, it will again be noted that each sleeve 68 has a rod 70 which is slidable therein. The rod 70 traverses a distance extending from the worm gear 26 to the shift collar 20 and is provided with pins 108, 110 and 112. These pins protrude through slots 114 and 116 respectively in sleeve 68. As may be seen in FIGURES 4 and 13, the pins 108 and 110 extend into the shift collar 20.

The shift collar 20 comprises a ring 118 having two flanges 120 mounted or formed on opposite ends thereof. The flanges 120 have engaged therebetween a pair of ring elements 124 forming part of a shift bar 126 as seen in FIGURE 1. The rollers 124 are mounted on respective arms of a yoke 128. The yoke 128 is pivotably mounted on a bracket 130 and is pivoted by means of handle 132 to bear against one of the flanges 120. Thus the shift collar 20 may be moved in a direction parallel to the axis 36 and it in turn moves the rods 70 therewith, as far as the slot 114 allows.

The pin 112 is located adjacent the other end of rod 70 and aligned with junction of back plate 24 and worm gear 26. It protrudes through the slot 116 in sleeve 68 and carries a detent ball 134 on its projecting end. The ball 134 is partially seated in a semicylindrical groove 136 provided in one face of the back plate 24 and partially seated at one end of a passageway 138 in the worm gear 26 as seen in FIGURES 4, 6, 10 and 11. With this coupling, the worm gear 26 will normally rotate about the axis 36 when the actuator assemblies 66 are rotated by the drive pulley 12.

The axis of the passageway 138 is set at an angle transverse to the axis 36. Therefore, as the rod 70 is moved by the shift collar to traverse the passageway 138, it rotates the worm gear 26 in, for example, a clockwise direction as seen in FIGURE 10. The worm gear 26 rotates through an arc dependent on the angle of the passageway 138 with respect to axis 36 and on the distance through which the ball 134 is moved in the passageway 138.

At the end of the passageway 138 the ball encounters the shoulder 85 on the face plate 30 and a recess may be provided in the shoulder to receive the ball. Thus either the shoulder 85 or the ends of the slots 114 or 116 may act as stops to limit the movement of rod 70 and the rotation of gear 26. Of course, when the shift collar is retracted to its normal position, the rod 70 and ball 134 are returned to normal and rotate the gear 26 back to its original position.

It will be noted from FIGURE 10 that the sleeves 68 each pass through an arcuate recess 140 in the worm gear 26. These recesses extend over an arc of sufficient degree to permit the worm gear 26 to rotate without encountering the sleeve 68, when the shift collar 20 is moved longitudinally along the axis 36. Thus the worm gear 26 is adapted to be rotated both by the drive pulley 12 and independently rotated by the movement of the shift collar 20 along the longitudinal axis 36 of the chuck assembly 10.

Worm gear 26 and worm gear 14 each have a worm segment 149 adapted to be engaged by respective worm assemblies 150 and 150a. Both worm assemblies 150 and 150a are substantially similar and, as may be seen in FIGURES 17 and 18, each comprises a substantially U-shaped bracket 152 with a worm 154 mounted on a shaft journalled in the legs 156 and 158 of the U and adapted to be rotated by a knob 160. The cross bar of the U carries a dovetail slide 162. The slide 162 on assembly 150 is adapted to engage a correspondingly shaped dovetail recess or way 163 in back of the scroll plate 28 as seen in FIGURE 4. The dovetail 152 is slid into the recess 163 in plate 28 until the worm 154 engages the worm segment 149 on the gear 26 and a screw 164 is then inserted into the aperture 165 to fasten the worm assembly 150 into its assembled position. A similar arrangement is used to fasten the worm assembly 150a on the back of thrust ring 16 with the worm 154 on that assembly in engagement with the worm segment 149 on gear 14. Both worm gear assemblies 150 and 150a carry a detent arrangement 166.

The detent arrangement is carried between a pair of legs 168 and 170 formed on the bracket 152 and comprise a wheel 172 coaxial with the worm 154 and adapted to be rotated simultaneously therewith. Each wheel 172 has three series of 11 peripheral indentations 175, 176 and 177. The indentations of each series are offset or staggered from the adjacent series by $$\frac{360°}{33}$$

or 11 degrees to provide a total of 33 steps in each revolution of the wheel 172 and worm 154. Each series of indentations is adapted to be engaged by a respective spring biased detent such as 178 and 178b carried on arm 180. The arm 180 in turn is mounted on the leg 170 by means of screws 181. Thus the worm 154 may be rotated and each time it passes through 1/33 of a revolution, one of the detents 178 will engage to provide a click indicating the arc traversed. When one of the detents 178 is seated in a corresponding indentation, the other two will be partially seated on opposite slopes of an adjacent indentation in the respective series to secure the worm against movement.

Thus the worm gear 14 is adapted to be rotated by the worm assembly 150a. As it rotates, the rod 62 is moved for adjusting the trunnion bar assemblies 42 to bring sleeves 50, 52 and 54 into engagement with the work piece 38. Thus each detent 178, etc., provides a click that indicates the trunnion assemblies are rotated to accommodate a .01″ diameter change in the work piece and will move the trunnion assemblies over about 24° in response to six full turns of the knob 160 to accommodate work pieces from ¼″ to 2½″. The setting of the trunnion assemblies 42 is shown by a scale 182 mounted on the thrust ring 16 and referenced by a pointer 182a mounted on the worm gear 14.

The worm gear 26 is rotated by the worm assembly 150. When gear 26 rotates, it causes the detent balls 134 engaged in passageway 138 to rotate the chuck actuator assemblies 66. As the chuck actuator assemblies rotate, the face plate 30 and the chuck jaw assemblies 32 also rotate. The rollers 102 on the chuck jaw assemblies are engaged in the respective scroll recesses and as the scroll plate 28 rides on the shoulder 85 it remains stationary to cam the jaw assemblies along their respective radial lines toward or away from the work piece. This permits the chuck jaw assemblies to be set against the work piece in conformance with the trunnion assemblies supporting the piece. A scale 183 set on the scroll plate 28 permits the various dimensional changes to be read off by means of a pointer 183a mounted on the worm gear 26.

The operation of the chuck assembly 10 may be briefly summarized as follows. The worm assemblies 150 and 150a are operated to set the chuck jaw assemblies 32 and the trunnion bar assemblies 42 to the approximate work piece diameter, and the work piece 38 engaged in the passageway 34. The worm assembly 150 may then be operated through one or more detent clicks indicating change of .01″ in diameter per click to set the jaw assemblies properly. The worm assembly 150a is similarly operated to set the trunnion bar assemblies and the setting includes a sliding clearance for the work piece. Each setting normally includes a tolerance of 1/32″ in diameter of the work piece, as the work pieces may vary from their normal diameter, and once a setting is made the chuck is capable of accommodating a number of successive pieces of the same nominal diameter.

Power is then applied to the drive pulley 12 to rotate the actuator assemblies 66, the worm gear 14, the thrust ring 16, the shift collar 20, the back plate 24, the trunnion bar assemblies 42, the worm gear 26, the scroll plate 28, the face plate 30 and the chuck jaw assemblies 32. As the chuck jaws 40 tightly engage the work piece 38, the work piece also rotates so that it may be cut or other appropriate operations performed thereon.

At the end of the desired operation the yoke handle 132 is operated to move the shift collar to the left. As this occurs, ball 134 rotates the worm gear 26. As the worm gear 26 rotates, it carries the worm assembly 150 therewith to also rotate the scroll plate 28 in the same direction. As viewed in FIGURES 9 and 10, this direction is clockwise so that the scroll recesses 106 move the rollers 102 and the connected chuck jaws 40 radially away from the work piece 38. The work piece is now free to be removed from the chuck assembly 10 and a new work piece inserted therein. In automatic screw machine or pipe cutting operations, the new work piece would simply be another section of pipe, for example, that is being continuously fed through the chuck. After the new work piece is inserted, the shift collar is retracted to return the detent ball 134 and thereby rotate the worm gear 26 and scroll plate 28 back to normal. As the scroll plate 28 is returned to normal it again brings the chuck jaws 40 into tight gripping engagement with the work piece. This permits each work piece to be quickly and easily engaged and disengaged from the assembly. Thus the ball 134 will move through passageway 138 a sufficient distance to enable the chuck jaws to release the work piece and be moved back sufficiently to cause the chuck jaws to engage a second work piece irrespective of slight differences in diameter and without changing the relative setting of the worm 26 with respect to the scroll or cam 28.

Figure 19:
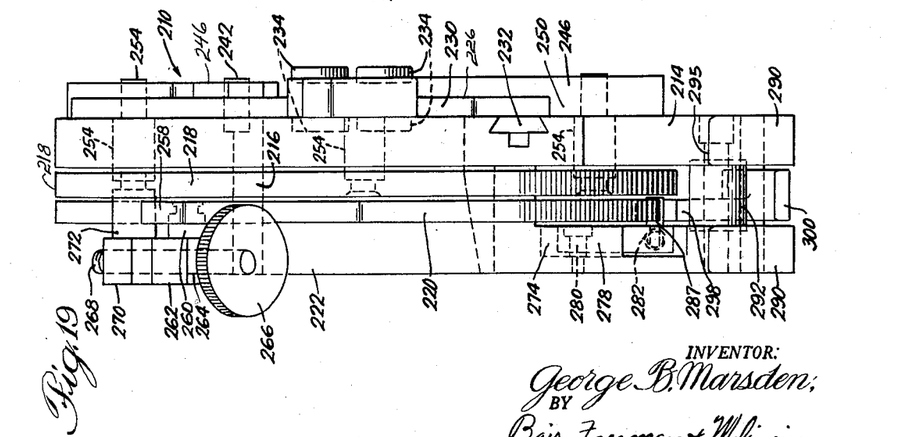
FIGURE 19 is a side elevational view of the stationary type chuck embodying the principles of the present invention.
Figure 20:
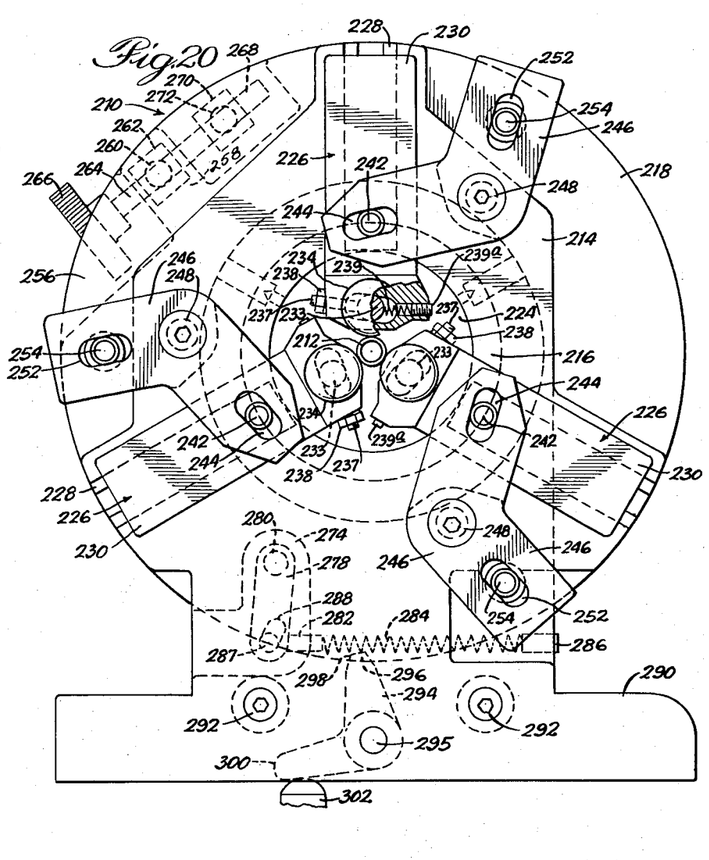
FIGURE 20 is a front elevational view of the chuck shown in FIGURE 19.

Referring now to FIGURES 19 and 20, a chuck assembly 210 for holding a stationary work piece 212 is illustrated therein. The chuck assembly comprises a face plate 214 having a hub portion 216 upon which are mounted in sequence from right to left, as seen in FIGURE 19, an inner ring 218, an outer ring 220 and a back plate 222.

The hub portion 216 of the face plate 210 defines an internal passageway 224 in which the work piece is held. The work piece is held or gripped by three chuck jaw assemblies 226, which are mounted on respective dovetail guideways 228 formed on the face plate 210 and a portion of the area of the face plate between the guideways is cut away to expose the inner ring 218 as seen in FIGURE 20.

The jaw assemblies 226 are similar to the jaw assemblies previously described in that each comprises a block 230 having a dovetail slide portion 232 thereon adapted to slide in the respective recess 228 along the radial line from the central axis. Each chuck jaw assembly 226 also comprises a jaw similar to that previously described in that a shaft 233 having a pair of jaws or rollers 234 thereon is supported in a slot 236 at one end of the block 230. The position of the rollers 234 is adjusted on one side by a screw 237 having locking nut 238 and on the other side by a spring 239 whose tension is adjusted by the screw 239a.

Instead of a pin such as 102 projecting from each jaw assembly through the face plate as before described, each jaw assembly is provided with a pin or roller 242 projecting away from the face plate. The roller 242 engages a slot 244 in a respective lever arm 246.

Each lever arm 246 is pivotally mounted on the face plate at a respective pin 248 and a suitable offset portion 250 thereon engages with the face plate 214 and projects over a cut away portion of the face plate. The offset portion 250 of the lever arm has a slot 252 therein, through which a pin 254 projects.

The pin 254 is mounted in the inner ring 218 and when the ring 218 is turned or rotated, the pin 254 serves to shift the lever arm 246 about the pivotal mounting 248 and cam the associated jaw block assembly 226 radially either towards or away from the central axis for gripping or releasing the work piece.

The outer ring 220 has a cut away portion 256, as seen in FIGURE 20, in which is provided an upstanding shoulder 258 approximately midway in the cut away portion. The shoulder 258 carries a pin 260 which is swivelly connected to the nut 262. The nut 262 is engaged by a screw 264 with that portion of the screw engaging nut 262 having either a left or righthand thread. The screw has a knurled knob 266 thereon which permits the screw to be turned easily and a portion 268 of the screw has a thread opposing the engaging nut 262. Thus, if nut 262 is engaged by a righthand thread, the portion 268 of the screw 264 is provided with a lefthand thread. Portion 268 of screw 264 is engaged by a nut 270.

The nut 270 in turn is swivelly mounted on a pin 272 which is connected through the cut away portion 256 with the inner ring 218. Thus, if the screw 264 is operated in one direction it will thread past the nut 262 and, since the portion 268 engaging nut 270 is of opposite thread, the nut 270 will be moved either away from or toward the nut 262. As it moves, it carries the inner ring 218 across an arc relative to the face plate 214 so as to swivel the lever arms 246 about the respective pivots 248. As the lever arms swing they move the chuck jaw assemblies 226 either toward or away from the work piece 212 to thereby enable the chuck jaws 234 to be adjusted to the work piece. The swivel mounting of the nuts 262 and 270 of course permits the nuts to rotate about the respective axis perpendicular to screw 264 and thereby prevent binding as the angular spacing changes.

The back plate 222 is provided with a recess 274. The recess 274 has a lever arm 278 pivotally mounted therein at one end by a pin 280. The lever arm 278 is engaged adjacent its other end by a dowel or actuating pin 282 transverse to pin 280 and is biased in one direction by a spring 284 located in the back plate. The spring is adjustably held in position in the back plate by the screw 286. The other end of the lever arm 278 is also provided with a pin 287, which is engaged in a slot 288 in the periphery of the outer ring 220, thereby engaging the outer ring with the back plate 222.

The face plate 214 and the back plate 222 each have a correspondingly shaped support or base portion 290 thereon which are bolted together at 292. The base portions 290 may be appropriately mounted on a support for the chuck assembly 210 and on which the chuck assembly may be secured, if desired, in any well known manner.

A lever arm 294 is pivotally mounted at 295 between the two support portions 290, and one end 296 of the lever arm 294 engages a recess 298 in the outer ring 220. The other end 300 of the lever arm 294 is engaged by an actuating rod 302 between the two base portions 290. By operating rod 302, the lever arm 294 is pivoted to rotate the outer ring 220 and this moves pin 287. The lever arm 278 is therefore also rotated against the bias of spring 284. As the outer ring 220 rotates, it carries the screw 264 and nuts 262 and 272 therewith. The nut 272 transmits the rotational movement to the inner ring 218 and thereby swivels lever arms 246. This moves the chuck jaw assemblies 226 out of engagement with the work piece. On release of the rod 302 the spring 284, acting against the lever arm 278, returns all of the components to normal.

Thus, to operate the chuck assembly, the work piece 212 is inserted in the central passageway and the chuck adjustment screw 264 operated to move the inner ring 218 with respect to the face plate 214. It will be noted that the outer ring 220 remains stationary with respect to the back plate 222 and face plate 214. As the inner ring 218 rotates it moves the lever arms 246 accordingly, whereby the position of the chuck jaw assemblies 226 is adjusted until the chuck jaws 234 grip the work piece 212, whereafter a desired operation is performed thereon.

To quickly release the work piece 212, the rod 302 may now be actuated. As it is actuated, the lever arm 294 is pivoted to shift the outer ring 220 with respect to the back plate 222 and the face plate 214. As the outer ring 220 shifts, the edge of the recess 288 bears against the pin 287 to pivot the lever arm 278 against the bias of spring 284. As the outer ring pivots, it also carries the screw 264 and the two swiveling nuts 262 and 272 therewith to thereby cause the inner ring 218 to pivot and shift the lever arms 246. As the lever arms 246 shift, the chuck jaws 234 open and the work piece may now be extracted and another pipe section or work piece inserted therebetween.

The actuating rod 302 is then released. As it releases, the bias of spring 284 is exerted against the lever arm 278. The lever arm 278 transmits this bias through the pin 287 to the outer ring 220. The outer ring 220 now rotates back to its original position, carrying the inner ring 218 and the lever arms 246 therewith. The lever arms 246 in turn reset the chuck jaw assemblies 226 so that the work piece is now firmly gripped. In this manner successive pieces may be quickly and easily chucked and unchucked.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A chuck comprising a face plate having a central opening therein through which a work piece may extend, a plurality of chuck jaws movably mounted on the face plate for radial movement toward and away from a work piece extending through the opening, a cam member movable relative to the face plate and operatively connected to the jaws to move them, an operating member movable within fixed limits, and adjustable setting means connecting the operating member to the cam and adjustable to vary the position of the jaws when the operating member is at its limiting position in one direction to adjust the chuck for different sized work pieces.

2. The chuck of claim 1 further including a plurality of guide rods in an annular array coaxial with the opening in the face plate to engage and center a work piece, and setting means to move the rods simultaneously toward or away from the axis of the opening to engage and guide work pieces of different sizes.

3. A chuck comprising a face plate having a central opening therein through which a work piece may extend, a plurality of chuck jaws movably mounted on the face plate for radial movement toward and away from a work piece extending through the opening, a cam member mounted on the face plate for rotation about the axis of the opening and operatively connected to the jaws to move them, an operating member movable within fixed limits and including a control member mounted for limited rotation relative to the face plate, and adjustable setting means connecting the cam member and the control member and adjustable to vary the angular relationship thereof thereby to vary the initial setting of the jaws for different size work pieces.

4. The chuck of claim 3 in which the control member is an annular worm gear and the setting means is a worm meshing with the gear and mounted on the cam member.

5. The chuck of claim 3 in which the control member is an annular ring rotatable relative to the cam member and the setting means is a threaded rod extending substantially tangentially of the cam member and ring and adjustably connecting them.

6. A chuck comprising a face plate having a central opening therein through which a work piece may extend, a plurality of chuck jaws movably mounted on the face plate for radial movement toward and away from a work piece extending through the opening, a cam member mounted on the face plate for rotation about the axis of the opening and operatively connected to the jaws to move them, an operating member movable within fixed limits and including a control member mounted for limited rotation relative to the face plate, adjustable setting means connecting the cam member and the control member and adjustable to vary the angular relationship thereof thereby to vary the initial setting of the jaws for different size work pieces, a plurality of guide rods in spaced annular relationship coaxial with the opening in the face plate to engage and center a work piece, means mounting the guide rods for simultaneous movement toward and away from the axis of the opening, and a second setting means connected to the mounting means to adjust the guide rods for different sizes of work pieces.

7. A chuck comprising a face plate having a central opening therein through which a work piece may extend, a plurality of chuck jaws movably mounted on the face plate for radial movement toward and away from a work piece extending through the opening, a cam member mounted on the face plate for rotation about the axis of the opening and operatively connected to the jaws to move them, an operating member movable within fixed limits and including a control member mounted for limited rotation relative to the face plate, adjustable setting means connecting the cam member and the control member and adjustable to vary the angular relationship thereof thereby to vary the initial setting of the jaws for different size work pieces, an annular thrust ring spaced from the face plate and axially aligned therewith, a plurality of guide rods in spaced annular relationship coaxial with the face plate and thrust ring, arms supporting the guide rods and pivoted respectively to the thrust ring and face plate whereby the guide rods can move toward and away from the axis to engage and guide different sized work pieces, an annular control ring rotatable around the axis, and means connecting the control ring to the arms simultaneously to adjust the arms.

8. A chuck comprising an annular bearing, an annular face plate rotatably supported in the bearing, jaws carried by the face plate for radial movement toward and away from a work piece extending through the bearing and face plate, a cam ring rotatable relative to the face plate and operatively connected to the jaws to move them, a control ring rotatable relative to the cam ring, adjustable setting means connecting the control and cam rings to adjust the angular relationship thereof thereby to vary the initial setting of the jaws, and operating means connected to the control ring to move it and the cam ring through a relatively small angle relative to the face plate thereby to move the jaws through a relatively small distance.

9. A chuck comprising an annular bearing, an annular face plate rotatably supported in the bearing, jaws carried by the face plate for radial movement toward and away from a work piece extending through the bearing and face plate, a cam ring rotatable relative to the face plate and operatively connected to the jaws to move them, a control ring rotatable relative to the cam ring, adjustable setting means connecting the control and cam rings to adjust the angular relationship thereof thereby to vary the initial setting of the jaws, an operating member shiftable axially of the face plate between fixed limits, and cam means connecting the operating member to the control ring to turn it through a relatively small angle relative to the face plate when the operating member is shifted.

10. A chuck comprising a pair of axially spaced annular bearings, an annular face plate rotatably supported by one of the bearings, jaws carried by the face plate for movement toward and away from a work piece extending through the bearings and face plate, an annular thrust ring rotatably carried by the other bearing, spaced connector members connecting the face plate and thrust ring, a cam ring rotatable relative to the face plate and operatively connected to the jaws to move them, a control ring rotatable relative to the cam ring, adjustable setting means connecting the cam ring and control ring to set the jaws for different sized work pieces, an operating member movable between fixed limits, means connecting the operating member to the control ring to turn it through a relatively small angle relative to the face plate when the operating member is moved, a plurality of guide rods in annular spaced relationship coaxial with the face plate and thrust ring, means mounting the guide rods for simultaneous movement toward and away from the axis, a second control ring rotatable relative to the face plate and thrust ring, and adjustable means connecting the second control ring to the mounting means to adjust the positions of the guide rods.

11. The chuck of claim 10 in which the operating member is movable axially and the means connecting the operating member to the control ring is a cam mechanism.

12. The chuck of claim 10 in which the guide rods are mounted on pivoted arms and the second control ring engages the arms to move them.

References Cited in the file of this patent

UNITED STATES PATENTS

| | | |
|---|---|---|
| 1,263,894 | Hottinger | Apr. 23, 1918 |
| 1,766,276 | Berg | June 24, 1930 |
| 2,776,842 | Marsden | Jan. 8, 1957 |
| 2,932,524 | Pealer | Apr. 12, 1960 |